United States Patent [19]

Toyama

[11] Patent Number: 4,931,634
[45] Date of Patent: Jun. 5, 1990

[54] OPTICAL POSITION SENSOR USING KERR EFFECT AND A MAGNETIC SCALE

[75] Inventor: Kiyoshi Toyama, Gifu, Japan

[73] Assignee: Teijin Seiki Company Limited, Osaka, Japan

[21] Appl. No.: 274,286

[22] Filed: Nov. 21, 1988

[30] Foreign Application Priority Data

Dec. 28, 1987 [JP] Japan .............................. 62-335333
Feb. 8, 1988 [JP] Japan .............................. 63-28381

[51] Int. Cl.$^5$ .................... G02F 1/01; G01D 5/34; G01B 7/14
[52] U.S. Cl. .................................. 250/225; 324/260; 324/207.13; 250/227.17; 250/231.13; 360/114
[58] Field of Search ............ 350/376, 375, 378, 377; 360/114; 365/122; 341/13–15; 324/96, 207–208, 244, 260; 250/231 SE, 237 G, 225, 227; 356/373

[56] References Cited

U.S. PATENT DOCUMENTS

| | | | |
|---|---|---|---|
| 3,453,614 | 7/1969 | Bose | 341/15 |
| 4,618,901 | 10/1986 | Hatakeyama et al. | 360/114 |
| 4,654,837 | 3/1987 | Browder | 360/114 |
| 4,677,513 | 6/1987 | Naito | 360/114 |
| 4,695,796 | 9/1987 | Omet et al. | 324/244 |
| 4,730,289 | 3/1988 | Saitoh et al. | 360/114 |
| 4,746,791 | 5/1988 | Forkel | 324/208 |
| 4,777,553 | 10/1988 | Aoi et al. | 360/114 |

*Primary Examiner*—David C. Nelms
*Assistant Examiner*—Michael Messinger
*Attorney, Agent, or Firm*—Lane & Aitken

[57] ABSTRACT

An optical position sensor of aircraft comprises light emitting means, an optical block, and a movable magnetic scale disposed in opposed relationship to the optical block. The sensor further comprises first optical wave guiding means connected at its one end to the light emitting means, polarizing means connected at its one end directly to the other end of the first optical wave guiding means and connected at its other end directly to one end of the optical block, and polarization detecting means connected at its one end directly to the other end of the optical block. The sensor further comprises second optical wave guiding means connected at its one end directly to the other end of the polarization detecting means, and opto-electric converting means connected to the other end of the second optical guiding means.

3 Claims, 11 Drawing Sheets

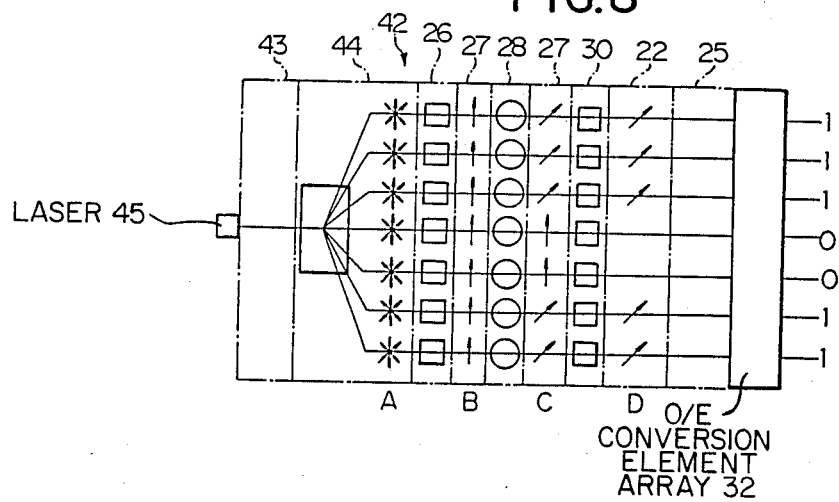
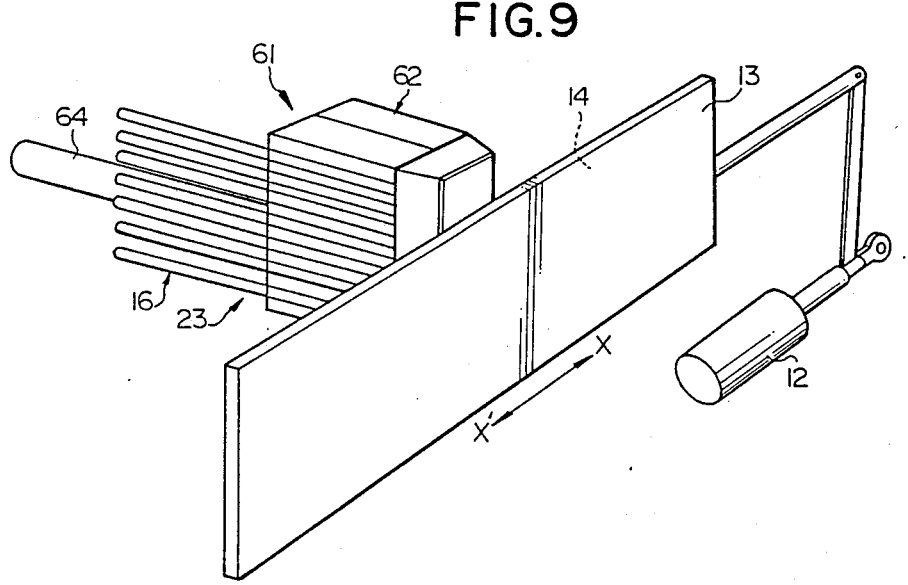

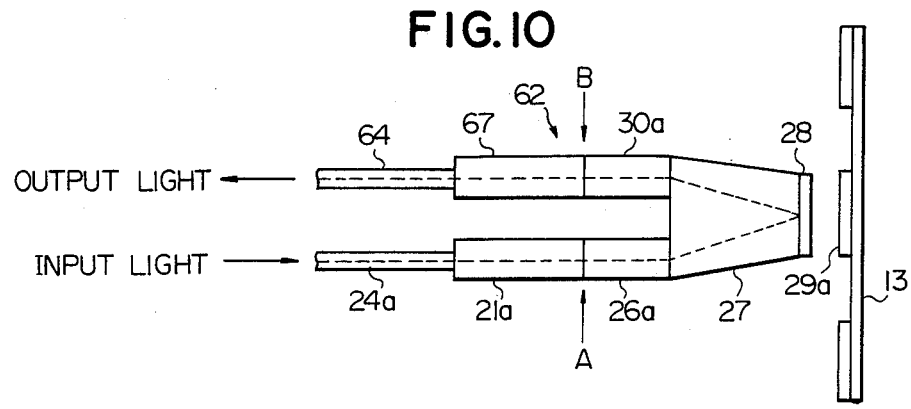
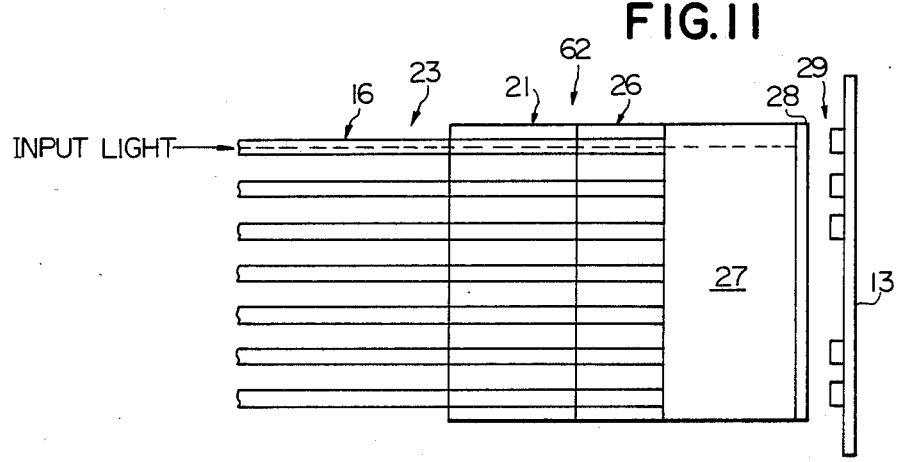
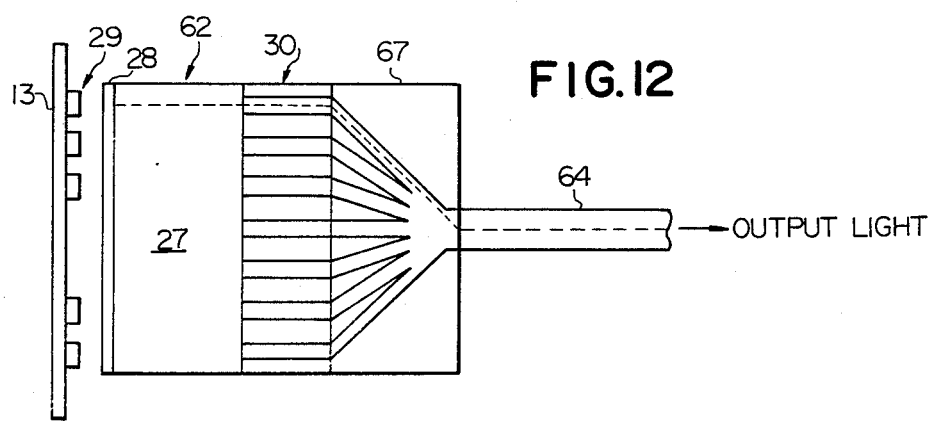

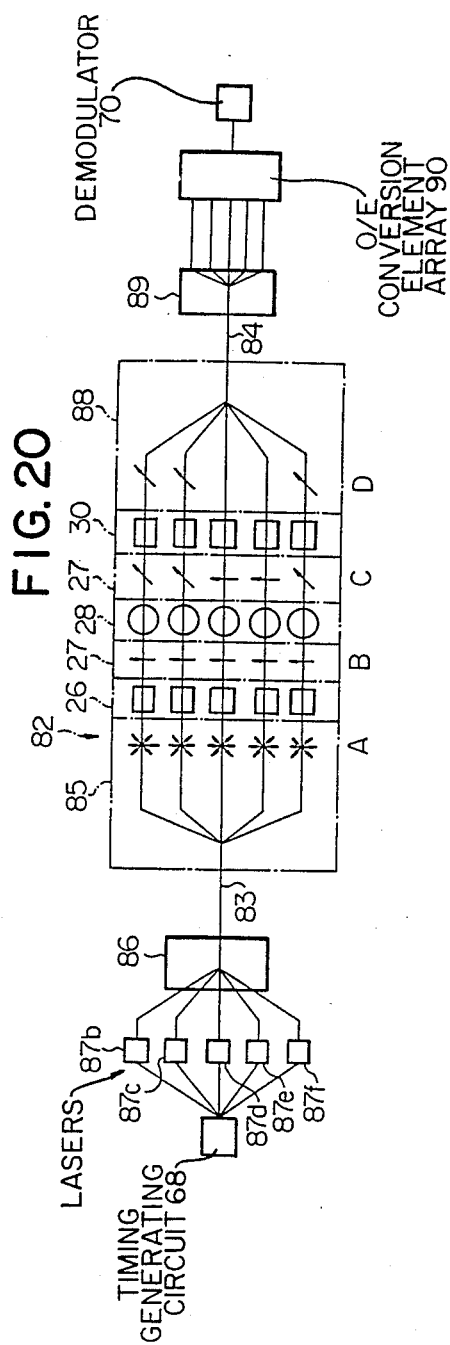
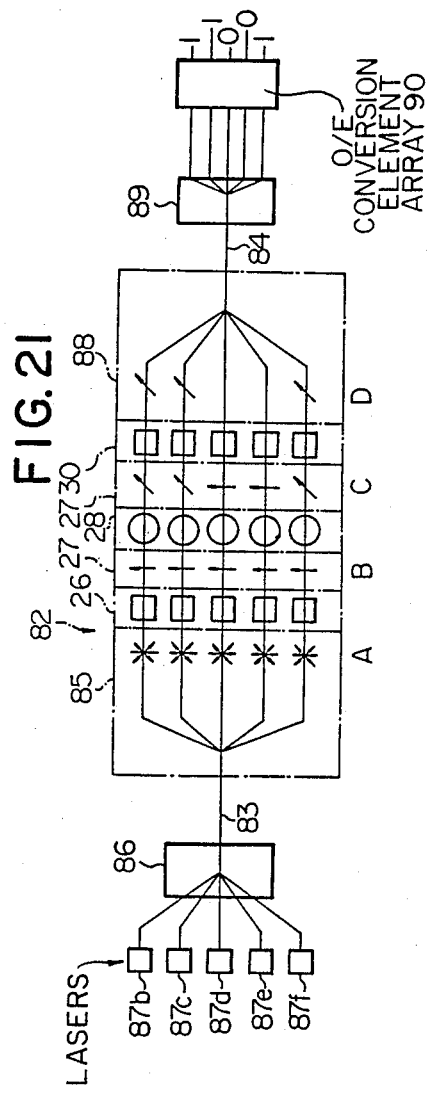
FIG. 20
FIG. 21

OPTICAL POSITION SENSOR USING KERR EFFECT AND A MAGNETIC SCALE

FIELD OF THE INVENTION

The present invention relates in general to an optical position sensor, and in particular to an optical position sensor which rotates the plane of polarization of an optical signal by magneto-optical effect and outputs an optical signal proportional to a predetermined magnetic change.

DESCRIPTION OF THE PRIOR ART

A position sensor for detecting the position of a moving body has been utilized in various fields such as industrial robots, aircraft, automatic production lines and the like. Although there are various kinds of position sensors, an optical position sensor for detecting the position of a moving body with the aid of an optical signal has been employed in order to avoid the errors caused by electrical noise signals.

Such a conventional optical position sensor is shown in FIG. 23 for instance. In FIG. 23, reference numeral 1 designates an optical rotary encoder, and the light emitted from a light emitting element 2 is inputted to a light receiving element 7 through a slit 4 formed in a rotary disc 3 and through a slit 6 formed in a stationary disc 5. The light is converted into an electric signal by the light receiving element 7, and the waveform of the electric signal is shaped and outputted by a Schmitt trigger circuit 8. As the rotary disc 3 rotates, the light from the light emitting element 2 is intermittently inputted to the light receiving element 7. As a result, a pulse signal proportional to the rotary speed of the rotary disc 3 is outputted by the Schmitt trigger circuit 8.

However, since the conventional optical position sensor mentioned above is constructed such that the optical signal from the light emitting element 2 passes through air and is transmitted to the light receiving element 7, the optical signal tends to be damped and deteriorated due to the dew occurring on the surfaces of the light emitting element 2 and light receiving element 7 and the dust in air. For example, in the case pressure and temperature are rapidly changed during a short period of time as in the case of aircraft, dew is subject to occur due to the change in pressure and temperature.

Accordingly, it is the object of the present invention to provide an improved optical position sensor which eliminates and overcomes the drawbacks mentioned above.

SUMMARY OF THE INVENTION

The foregoing object is accomplished in accordance with the present invention by providing an optical position sensor for an aircraft comprising: light emitting means for emitting light; an optical block having a Kerr effect type magneto-optical effect element mounted thereon; a movable magnetic scale disposed in opposed relationship to the magneto-optical effect element and having a plurality of magnetized segments mounted thereon; first optical wave guiding means connected at its one end to the light emitting means, the first optical wave guiding means being adapted for guiding the light emitted from the light emitting means; polarizing means connected at its one end directly to the other end of the first optical wave guiding means and at its other end directly to one end of the optical block, the polarizing means being adapted to convert the light into light having a single plane of polarization, the single plane of polarization being rotated to a predetermined angle by the magneto-optical effect element in the presence of the magnetized segments; polarization detecting means connected at its one end directly to the other end of the optical block, the polarization detecting means being adapted to pass therethrough light wherein the single plane of polarization is rotated to the predetermined angle; second optical wave guiding means connected at its one end directly to the other end of the polarization detecting means, the second optical wave guiding means being adapted for guiding the light from the polarization detecting means; and opto-electric converting means connected to the other end of the second optical wave guiding means, the opto-electric converting means being adapted for converting the light guided by the second optical wave guiding means into an electric signal.

In accordance with the present invention, as the propagation path of the optical signal does not pass through air and is limited within the optical position sensor head in accordance with the present invention, even if dew occurred on the surface of the optical position sensor head, the dew would have no effect on the propagation path of the optical signal. Accordingly, the optical signal can be effectively prevented from being damped and deteriorated even under particular circumstances wherein dew and the like tend to occur.

The polarizing means may comprise a plurality of polarizers and the polarization detecting means may comprise a plurality of analyzers.

The foregoing object is also accomplished in accordance with the present invention by providing an optical position sensor head comprising an optical block having a Kerr effect type magneto-optical effect element at its one end; polarizing means connected with the other end of the optical block; and polarization detecting means connected with the other end of the optical block in parallel relationship to the polarizing means.

BRIEF DESCRIPTION OF THE DRAWINGS

The drawbacks of a prior-art optical position sensor and the features and advantages of an optical position sensor according to the present invention will be more clearly understood from the following description taken in conjunction with the accompanying drawings:

FIG. 8 is a schematic diagram illustrating transmission paths of optical signals within the optical position sensor head of FIG. 5;

FIG. 9 is a perspective view showing the optical position sensor head of an optical position sensor constructed in accordance with a third embodiment of the present invention;

FIG. 10 is a top plan view of the optical position sensor head shown in FIG. 9;

FIG. 11 is a side elevational view of the optical position sensor head taken in the direction A of FIG. 10;

FIG. 12 is a side elevational view of the optical position sensor head taken in the direction B of FIG. 10;

FIG. 20 is a schematic diagram illustrating transmission paths of optical signals within the optical position sensor head of FIG. 17;

FIG. 21 is a schematic diagram illustrating transmission paths of optical signals in accordance with a sixth embodiment of the present invention;

DESCRIPTION OF THE PREFERRED EMBODIMENTS

For the better understanding of features and advantages of an optical position sensor according to the present invention, description is first made with reference to magneto-optical effect (hereinafter referred to as "Kerr effect") which is a fundamental principle of the present invention.

If an optical signal wherein the direction of the plane of polarization is constant is directed to a certain ferromagnetic material, the reflected light will be obtained at an angle corresponding to the angle of incidence. The direction of the plane of polarization of the reflected light is substantially the same as that of the incident light. However, if magnetism is applied to the aforesaid ferromagnetic material, the direction of the plane of polarization of the reflected light is optically rotated in proportion to the magnetic intensity. This is called Kerr effect. The Kerr effect is utilized in accordance with the present invention in a so-called linear encoder which detects the position of a body.

Figure 1:
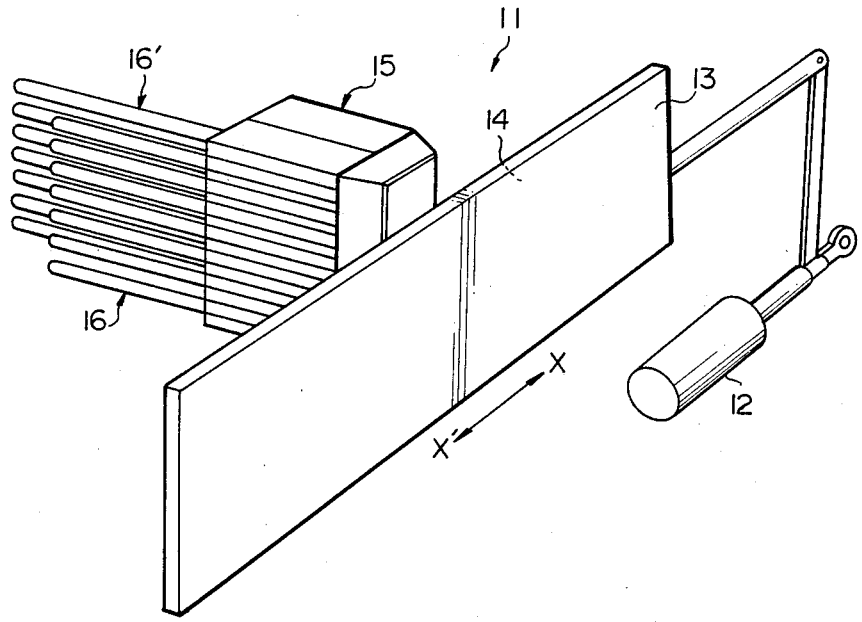
FIG. 1 is a perspective view showing the optical position sensor head of an optical position sensor constructed in accordance with a first embodiment of the present invention.

Referring to the drawings where the showings are for the purpose of illustrating preferred embodiments of the present invention only and not for the purpose of limiting same, FIG. 1 shows the invention incorporated in a linear encoder 11. The linear encoder 11 has a magnetic scale 13 which is driven to linearly move in directions X-X' shown in FIG. 1 by an actuator 12. The actuator 12 is adapted to control an angle of control surfaces of rudders and the like of aircraft, and the linear movement of the magnetic scale 13 corresponds to the angle of control surfaces. An optical position sensor head 15 is disposed in opposed relationship to the magnetic scale 13. On the opposed surface 14 of the magnetic scale 13 to the optical position sensor head 15 are uniformly arranged a plurality of magnetized segments. The arrangement of the magnetized segments is closely related to the structure of the optical position sensor head 15 which is disposed in opposed and non-contact relationship to the magnetic scale 13, and this will hereinafter be described. Reference numeral 16 is a group of optical fibers for inputting optical signals to the optical position sensor head 15, while reference numeral 16' is a group of optical fibers for outputting optical signals from the optical position sensor head 15.

Figure 2:
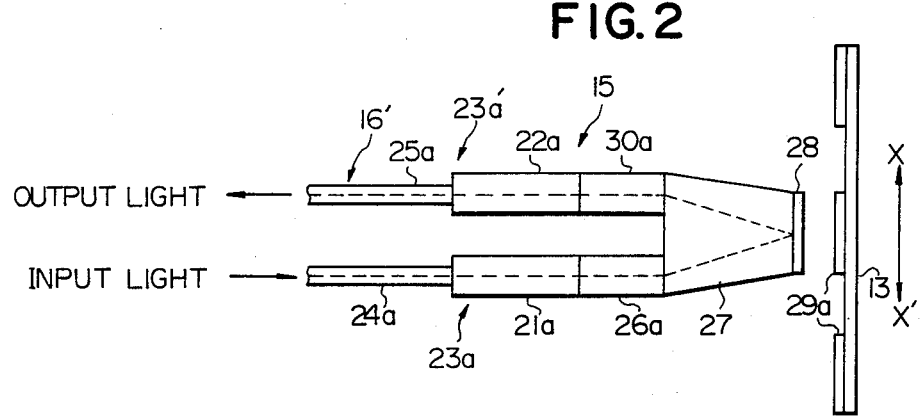
FIG. 2 is a top plan view of the optical position sensor head shown in FIG. 1.
Figure 3:
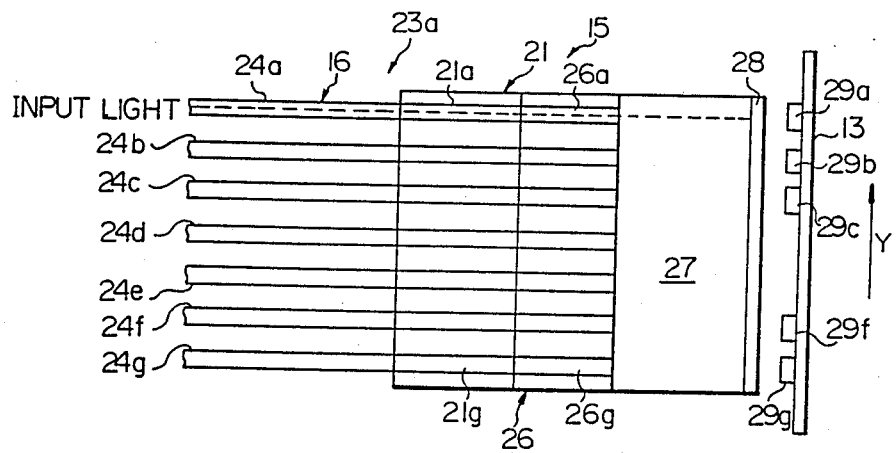
FIG. 3 is a side elevational view of the optical position sensor head shown in FIG. 2.

FIG. 2 is a top plan view of the optical position sensor head 15 which is disposed in opposed relationship to the magnetic scale 13, while FIG. 3 is a side elevational view of the optical position sensor head 15 shown in FIG. 2. In FIG. 3, the optical position sensor head 15 includes seven input optical waveguides 21a to 21g which are adapted to guide seven input lights to the optical position sensor head 15. It should be here noted that the members corresponding to the optical signals of seven systems are designated by characters a, b, c, d, e, f and g, respectively, and that only the members designated by character a will hereinafter be described in all of the embodiments herein described for avoiding the description of the members b, c, d, e, f and g each having the same function. The seven systems are called channels, which are designated by characters CHa, CHb, CHc, CHd, CHe, CHf and CHg, respectively.

As shown in FIG. 2, the input optical waveguide 21a is connected at its one end to an optical fiber 24a which forms a part of the optical fiber group 16, and at its the other end to a polarizer (polarizing means) 26a which is adapted to convert the input optical signal into an optical signal having a single plane of polarization. The polarizer 26a is connected to an optical block such as a prism 27 which has a magneto-optical effect element (Kerr effect reflection means) 28 mounted on the end face of the prism 27 opposing to the magnetic scale 13. According to the aforesaid Kerr effect, the magneto-optical effect element 28 rotates optically and reflects the plane of polarization of the optical signal in accordance with the arrangement of the magnetized segments 29a to 29g. The reflected optical signal by the magneto-optical effect element 28 passes through the prism 27 and is directed to an analyzer (polarization detecting means) 30a which is adapted to select and pass therethrough only an optical signal having a constant plane of polarization. That is, as the magnetized segment 29a is moved to a predetermined position, the analyzer 30a selects and passes therethrough only an optical signal wherein the plane of polarization is optically rotated by the magneto-optical effect element 28. To the analyzer 30a is connected an output optical waveguide 22a which guides to an optical fiber 25a the optical signal that passed through the analyzer 30a. The optical fiber 25a forms a part of the aforesaid group of optical fibers 16' which comprises seven optical fibers 25a to 25g.

The aforesaid optical fiber 24a for an input light and the aforesaid input optical waveguide 21a as a whole constitute first waveguide 23a, while the output optical waveguide 22a and the optical fiber 25a for an output light as a whole constitute second waveguide 23a'. The first and second waveguides 23a and 23a' constitute first optical wave guiding means and second optical wave guiding means, respectively.

The magneto-optical effect element 28 is adapted to reflect seven independent optical signals in accordance with the aforementioned Kerr effect, and the magnetized segments 29a to 29g mounted on the scale 13 are arranged in correspondence with points at which seven optical signals are reflected by the magneto-optical effect element 28. More particularly, the magnetized segments 29a to 29g are arranged in the direction shown by the arrow Y in FIG. 3 and in parallel relationship to the directions X-X' of FIG. 2 in which the magnetic scale 13 is moved. However, some of the magnetized segments 29a to 29g are not provided as shown in FIG. 3 in order to obtain a predetermined optical signal, i.e., an encode data, and this will hereinafter be described.

Figure 4:
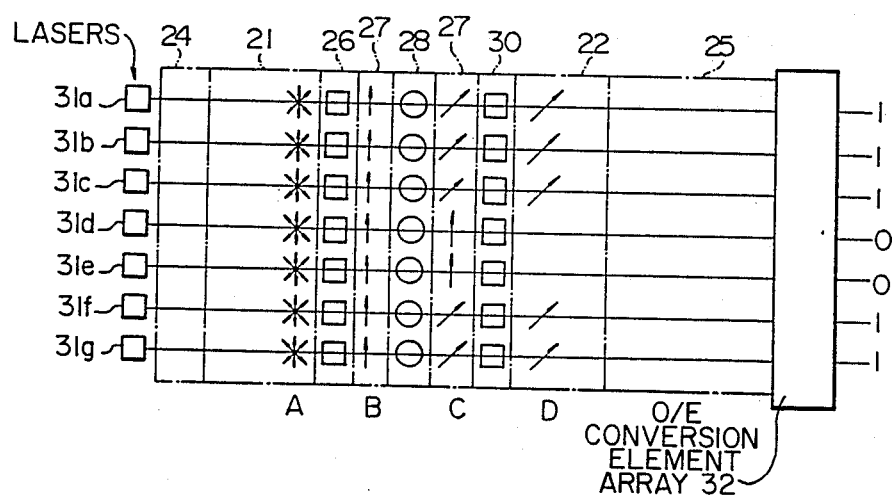
FIG. 4 is a schematic diagram illustrating transmission paths of optical signals within the optical position sensor head of FIG. 1.

In one end portions of the optical fibers 24 (24a to 24g) for inputting seven optical signals to the optical position sensor head 15, there are provided seven semiconductor lasers 31a to 31g each of which serves to emit an input light, as shown in FIG. 4. The semiconductor lasers 31a to 31g constitute light emitting means for emitting a light. Also, in one end portions of the optical fibers 25 (25a to 25g) for outputting the optical signals reflected by the magneto-optical effect element 28, there is provided an opto-electric conversion element array (opto-electric converting means) 32 which has opto-electric conversion elements (not shown) respectively corresponding to the channels CHa to CHg. The opto-electric conversion element array 32 has a photodiode array, CCD (Charge Coupled Device) or the like for instance, and is adapted to convert the optical signal outputted from the optical position sensor head 15 into an electric signal (hereinafter referred to as "opto-electric conversion") and output the converted signal.

Thus, in the first embodiment shown in FIGS. 1 to 4, the light emitting means comprises a plurality of the semiconductor lasers 31. The first optical wave guiding means comprises a plurality of the first waveguides 23 corresponding in number to a plurality of the semiconductor lasers 31 and the second optical wave guiding means comprises a plurality of the second waveguides 23' corresponding in number to a plurality of the analyzers 30.

The operation of the linear encoder 11 constructed and arranged as mentioned above will hereinafter be described in detail.

FIG. 4 illustrates transmission paths of optical signals within the optical position sensor head 15. In FIG. 4, the arrows A and B indicate the planes of polarization of the optical signals immediately before and after the polarizer 26, and the arrows C and D indicate the planes of polarization of the optical signals immediately before and after the analyzer 30. It is noted that the signal names of the members corresponding to the channels CHa to CHg are designated by characters a to g, respectively, in all of the embodiments herein described.

The optical signals respectively emitted from the semiconductor lasers 31a to 31g are guided by the respective optical fibers 24a to 24g and inputted to the optical position sensor head 15. At this point in time, the direction of the plane of polarization of each of the optical signals Aa to Ag in the waveguides 21a to 21g is random as shown in FIG. 4, and the optical signals Aa to Ag are converted by the polarizers 26a to 26g into optical signals Ba to Bg each having a single plane of polarization (linear polarization), as shown in FIG. 4. The converted optical signals Ba to Bg each pass through the prism 27 and are directed to the magneto-optical effect element 28. The directed optical signals are reflected by the magneto-optical effect element 28 and become optical signals Ca to Cg. The optical signals Ca to Cg again pass through the prism 27 and are respectively inputted to analyzers 30a to 30g. When this occurring, if only the magnetized segments 29a to 29c, 29f and 29g are arranged on the magnetic scale 13 in correspondence with the optical signals Ba to Bc, Bf and Bg as shown in FIG. 3, only the planes of polarization of the optical signals Ba to Bc, Bf and Bg are optically rotated (Kerr rotation) by the aforesaid Kerr effect. That is, the optical signals inputted to the analyzers 30a to 30g are optically rotated in accordance with the arrangement of the magnetized segments 29a to 29c, 29f and 29g, and only the optical signals Ca to Cc, Cf and Cg wherein the aforesaid Kerr rotation has occurred, can pass through the analyzers 30a to 30c, 30f and 30g as shown in FIG. 4. In this instance, the optical signals Cd and Ce cannot pass through the analyzers 30d and 30e as the Kerr rotation does not occur, and the optical signals Da to Dc, Df and Dg which passed through the analyzers are inputted through the waveguides 22 (22a to 22c, 22f and 22g) and the optical fibers 25 (25a to 25c, 25f and 25g) to the opto-electric conversion element array 32. Consequently, if a logic is [1] when an optical signal is received in the opto-electric conversion element array 32 and [0] when an optical signal is not received, the output of the array 32 will become [1 1 1 0 0 1 1] in the order of CHa to CHg. This means that a digital output is obtained in accordance with the arrangement of the magnetized segments 29. The absolute position of the magnetic scale 13 therefore can be detected as the arrangement of the magnetized segments 29 is changed in accordance with the movement of the magnetic scale 13.

Thus, as the transmission path of the optical signal does not pass through air and is limited within the optical position sensor head 15 in accordance with the present invention, even if dew occurred on the surface of the optical position sensor head 15, the dew would have no effect on the transmission path of the optical signal. Accordingly, the optical signal can be effectively prevented from being damped and deteriorated even under particular circumstances.

In addition to the aforesaid effect, there are also the following effects:

(I) As signals are transmitted by optical signals, they do not interfere with other electronic circuits and the like, and also an occurrence of cross talk is very few.

(II) As the absolute position of the magnetic scale 13 is outputted as a digital value, an optical position sensor head can be obtained which is suitable for use in a control system using a digital value.

(III) As electronic parts are not included within the optical position sensor head 15, power supply lines are not needed and also and also a recovery could be made rapidly even if there were an occurrence of EMI (Electromagnetic Interference) or EMP (Electromagnetic Pulse). Further, as the head 15 is structurally simple, production cost can be reduced and reliability can be enhanced.

(IV) As detecting means, i.e., the optical position sensor head 15 is disposed in non-contact relationship to the magnetic scale 13, durability can be enhanced.

Figure 5:
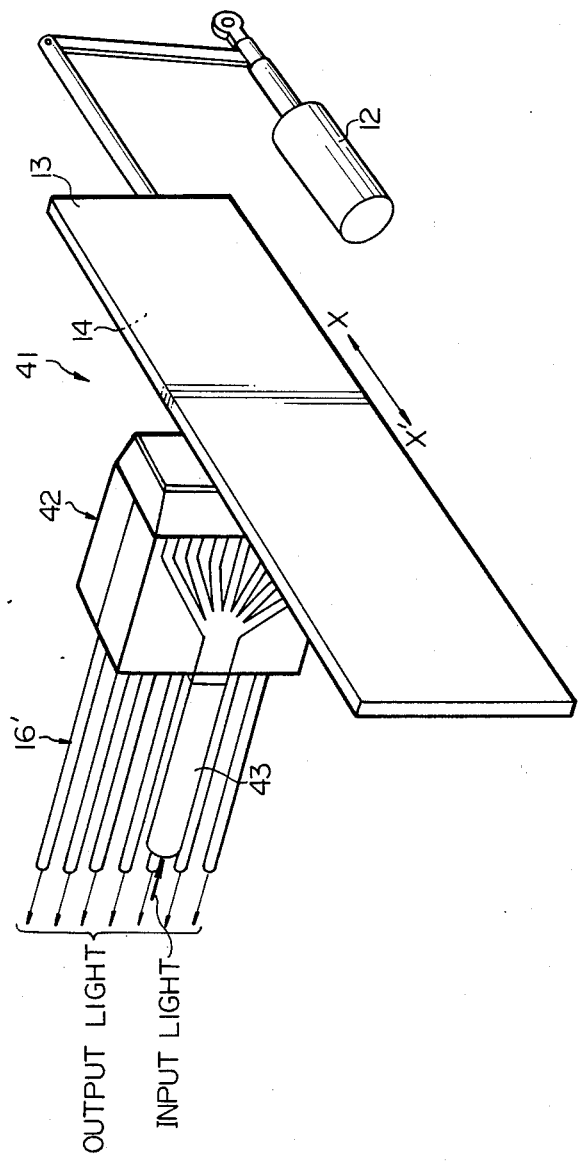
FIG. 5 is a perspective view showing the optical position sensor head of an optical position sensor constructed in accordance with a second embodiment of the present invention.

FIG. 5 shows a linear encoder 41 constructed in accordance with a second embodiment of the present invention. The members substantially identical to those of the first embodiment shown in FIGS. 1 to 4 are designated by like reference numerals for avoiding the detailed description. The second embodiment is characterized in that the aforementioned light emitting means comprises a single semiconductor laser 45 (FIG. 8) and that the aforementioned first optical wave guiding means comprises a single first waveguide 43 and optical distributing means 44 (FIG. 7) connected to the first waveguide 43 and adapted for distributing the light guided by the first waveguide 43 into lights corresponding in number to a plurality of polarizers 26a to 26g.

The linear encoder 41 has a magnetic scale 13 which is driven to linearly move in the directions X—X' shown in FIG. 5 by an actuator 12. An optical position sensor head 42 is disposed in opposed relationship to the magnetic scale 13. On the opposed surface 14 of the magnetic scale 13 to the optical position sensor head 42 are uniformly arranged a plurality of magnetized segments (not shown). The aforesaid single first waveguide 43 is constituted by an optical fiber for inputting an optical signal to the optical position sensor head 42.

Figure 6:
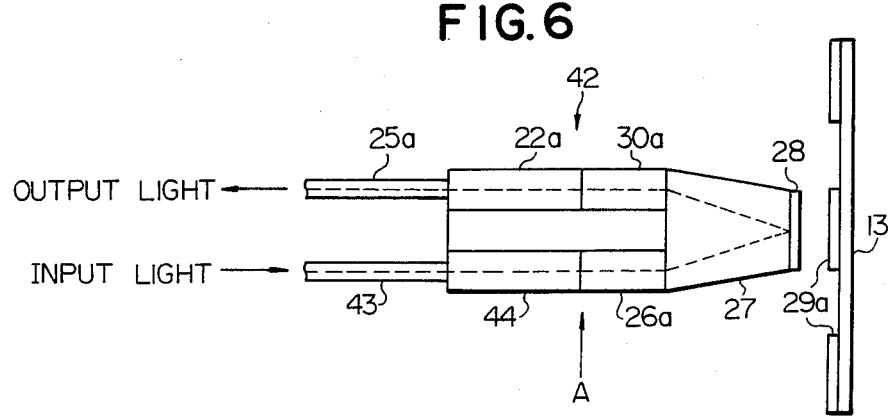
FIG. 6 is a top plan view of the optical position sensor head shown in FIG. 5.
Figure 7:
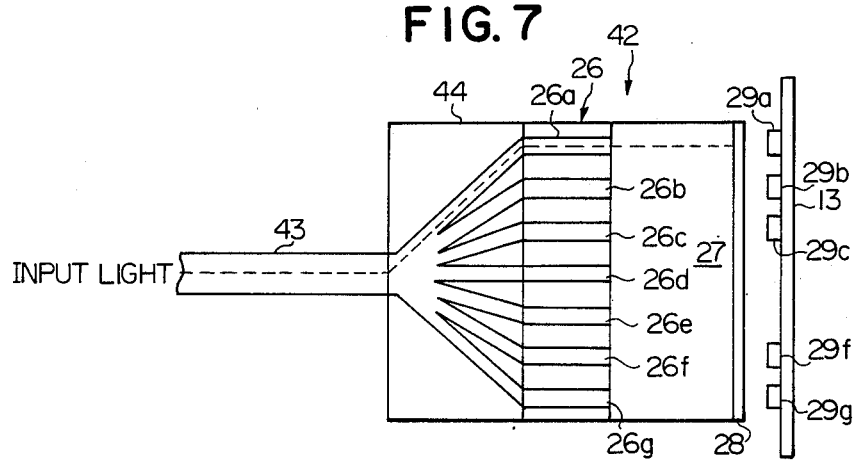
FIG. 7 is a side elevational view of the optical position sensor head taken in the direction A of FIG. 6.

FIG. 6 is a top plan view of the optical position sensor head 42 which is disposed in opposed relationship to the magnetic scale 13, while FIG. 7 is a side elevational view of the optical position sensor head 42 shown in FIG. 6. In FIG. 7, the optical position sensor head 42 includes the optical distributing means (optical distributor) 44 connected to the optical fiber 43, which optical distributor 44 is adapted to distribute the input light guided by the optical fiber 43 into seven lights. As previously mentioned, the members corresponding to the distributed seven input lights are designated by characters a, b, c, d, e, f and g, respectively, and only the member designated by character a will hereinafter be described for avoiding the description of the members b, c, d, e, f and g each having the same function.

The optical position sensor head 42 further includes the polarizing means 26 which is connected to at its one end to the optical distributor 44 and at its the other end to a prism 27. The polarizing means 26 comprises seven polarizers 26a, 26b, 26c, 26d, 26e, 26f and 26g. The prism 27 has a magneto-optical effect element (Kerr effect reflection means) 28 mounted on the end face of the prism 27 opposing to the magnetic scale 13. The reflected optical signal by the magneto-optical effect element 28 is directed to an analyzer (polarization detecting means) 30a. To the analyzer 30a is connected a waveguide 22a which guides to an optical fiber 25a the optical signal that passed through the analyzer 30a. The optical fiber 25a forms a part of a group of optical fibers 16' for outputting the output signal of the optical position sensor head 42, and the optical fibers 16' comprise seven optical fibers 25a to 25g. The optical fiber 25a and waveguide 22a constitute second optical wave guiding means.

In one end portion of the optical fiber 43 for inputting an optical signal to the optical position sensor head 42, there is provided the aforementioned single semiconductor laser (light emitting means) 45 which serves to emit an input optical signal, as shown in FIG. 8. Also, in one end portions of the optical fibers 25a to 25g for outputting the optical signals reflected by the magneto-optical effect element 28, there is provided an opto-electric conversion element array (transfer means) 32 which has opto-electric conversion elements (not shown) respectively corresponding to the seven channels CHa to CHg.

Thus, as the transmission path of the optical signal does not pass through air and is limited within the optical position sensor head 42 of the second embodiment shown in FIGS. 5 to 8, the same effect as the first embodiment will be obtained. Furthermore, in the second embodiment, as the optical distributor 44 is provided, the optical fiber 43 for directing an input light to the optical position sensor head 42 can be made a single optical fiber and also the semiconductor laser 45 corresponding to the optical fiber 43 can be made a single system. This embodiment is thus specially suited where the distance of the optical fiber 43 becomes longer as in the case of aircraft and the like, and can reduce space for the optical fiber 43.

Referring to FIGS. 9 to 15, there is shown an optical position sensor constructed in accordance with a third embodiment of the present invention. The members substantially identical to those of the first embodiment shown in FIGS. 1 to 4 are designated by like reference numerals for avoiding the detailed description. The third embodiment is characterized in that the aforementioned light emitting means comprises a plurality of semiconductor lasers and a timing generating circuit for generating timing signals, the semiconductor lasers being adapted to emit lights in response to the timing signals, and that the aforementioned first optical wave guiding means comprises a plurality of first waveguides, and that the aforementioned second optical wave guiding means comprises optical mixing means and a second waveguide connected to the optical mixing means.

In FIG. 9, reference numerals 61 and 62 denote a linear encoder and an optical position sensor head, respectively. The optical position sensor head 62 has connected thereto a group of optical fibers 16 which forms a part of first optical wave guiding means 23, and further has connected thereto a second waveguide 64 which is constituted by an optical fiber. FIG. 10 is a top plan view showing the optical position sensor head 62, FIG. 11 is a side elevational view of the optical position sensor head 62 taken in the direction A of FIG. 10 and FIG. 12 is a side elevational view of the optical position sensor head 62 taken in the direction B of FIG. 10. In FIG. 10, the input light is inputted through an optical fiber 24a forming a part of the group of optical fibers 16 and through a waveguide 21a to a polarizer (polarizing means) 26a. The light polarized by the polarizer 26a is directed through a prism 27 to a magneto-optical effect element (Kerr effect reflection means) 28. The directed light is reflected by the magneto-optical effect element 28 in accordance with the magnetism of a magnetized segment 29a, and the lights corresponding to channels CHa to CHg are guided through the prism 27 and an analyzer 30a to optical mixing means (optical coupler) 67 as shown in FIG. 12. The optical coupler 67 is adapted to mix and composite the lights corresponding to channels CHa to CHg, and the composite light is guided by the second waveguide 64. The aforesaid optical fiber group 16, waveguide 21 as a whole constitute the aforementioned first optical wave guiding means.

Figure 13:
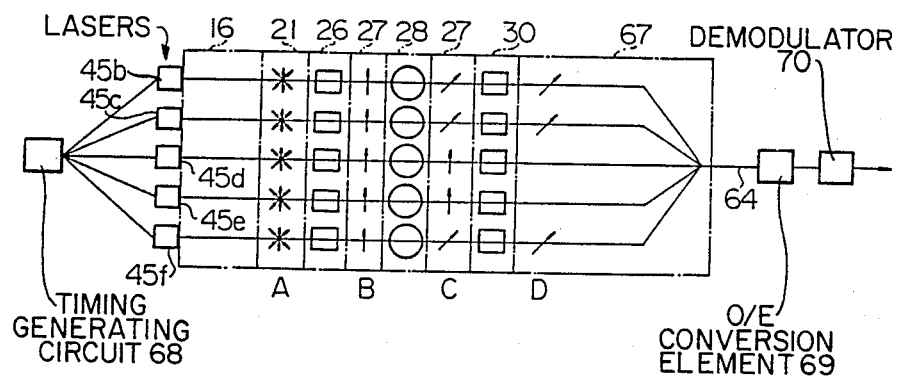
FIG. 13 is a schematic diagram illustrating transmission paths of optical signals within the optical position sensor head of FIG. 9.
Figure 14:
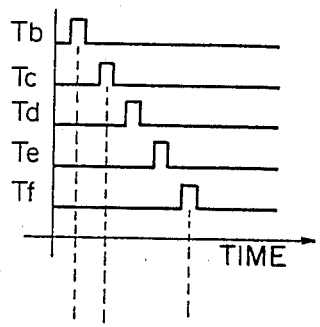
FIG. 14 is a diagram showing timing signals which are generated from the timing generating circuit of FIG. 13.
Figure 15:
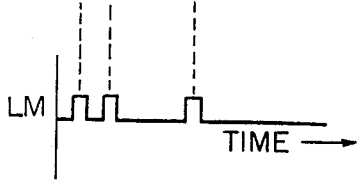
FIG. 15 is a diagram showing the output signal when the timing signals Tb, Tc and Tf of FIG. 10 are given.

Although in one end portion of the optical fiber group 16 there are provided the semiconductor lasers (light emitting means) 45a, 45b, 45c, 45d, 45e, 45f and 45g, the semiconductor lasers 45a and 45g respectively corresponding the channels CHa and CHg are omitted as shown in FIG. 13. Each of the semiconductor lasers 45b to 45f is adapted to emit a light in response to timing signals Tb to Tf generated from the timing generating means 68. As shown in FIG. 14, the timing signals Tb to Tf are pulse signals which are different in timing from one another. Therefore, the optical signals reflected by the magneto-optical effect element 28 are different in timing from one another in accordance with the timing signals Tb to Tf. If the Kerr rotations as shown by the arrow C in FIG. 13 are given, the optical signals Db, Dc and Df that passed through the analyzer 30 will be composited by the optical coupler 67, and become a composite optical signal LM as shown in FIG. 15 which is to be guided by the second waveguide 64. The composite optical signal LM is converted into an electric signal, i.e., serial data by an opto-electric conversion element 69, and further inputted to a demodulator 70 and converted into parallel data having the same timing, i.e., decoded data.

The aforesaid opto-electric conversion element 69 and demodulator 70 as a whole constitute opto-electric conversion means.

Thus, as the transmission path of the optical signal does not pass through air but is limited within the optical position sensor head 62 in accordance with the third embodiment, the same effect as the first embodiment will be obtained. In addition, the third embodiment is advantageous in that the optical signal proportional to the magnetic change of the magneto-optical effect element 28, i.e., the output of the encoder 61 can be guided as a single optical signal LM since the optical coupler 67 is provided.

Figure 16:
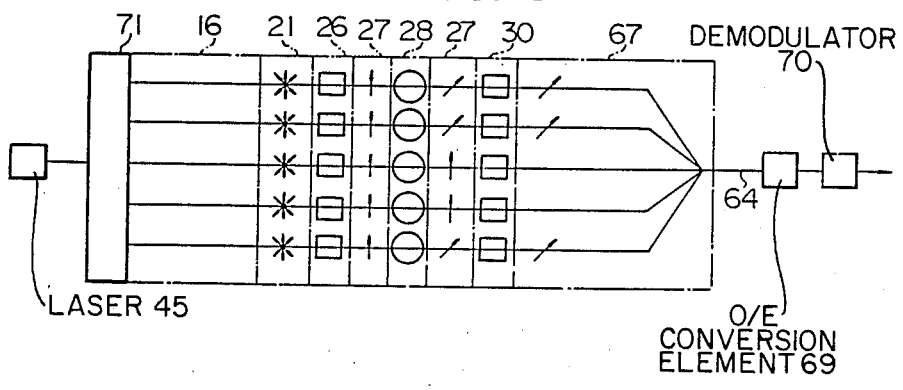
FIG. 16 is a schematic diagram illustrating transmission paths of optical signals in accordance with a fourth embodiment of the present invention.

FIG. 16 schematically illustrates transmission paths of optical signals in accordance with a fourth embodiment of the present invention. The optical position sensor head of this embodiment is not shown as being substantially identical in construction to the optical position sensor head 62 of the third embodiment shown in FIG. 9, but this embodiment is characterized in the manner in which an input light is given to the optical position sensor head. In FIG. 16, the members substantially identical to those of the third embodiment shown in FIG. 13 are designated by like referencce numerals for avoiding the detailed description. The light emitted from a semiconductor laser 45 is guided to an optical switch (sharing means) 71 which is adapted to output time-shared optical signals to the respective optical channels CHb to CHf in accordance with the timings as shown in FIG. 14. As in the case of the third embodiment, time-shared lights are inputted to the optical position sensor head 62, but in this embodiment the same input lights as the third embodimment are obtained by the provision of the optical switch (sharing means) 71 in place of the semiconductor lasers 45a to 45g of the second embodiment which emit lights in accordance with predetermined timing signals Ta to Tg of FIG. 14. Accordingly, the fourth embodiment can reduce production cost as the semiconductor laser 45 comprises a single semiconductor laser.

In the fourth embodiment, the aforementioned light emitting means comprises the single semiconductor laser 45. The aforementioned first optical wave guiding means comprises the optical sharing means 71 for sharing the light emitted from the single semiconductor laser 45 into a predetermined number of lights and generating the lights at different timings and a plurality of first guide passageways 23 each connected to the optical sharing means 71. The aforementioned second optical wave guiding means comprises optical mixing means 67 adapted for mixing and compositing lights that passed through polarization detecting means 30a to 30g into a composite light, and a second waveguide 64 connected to the optical mixing means 67 and adapted for guiding the composite light.

FIGS. 17 to 20 illustrate an optical position sensor constructed in accordance with a fifth embodiment of the present invention. The members substantially identical in construction to those of the first embodiment are designated by like reference numerals for avoiding the description.

Figure 17:
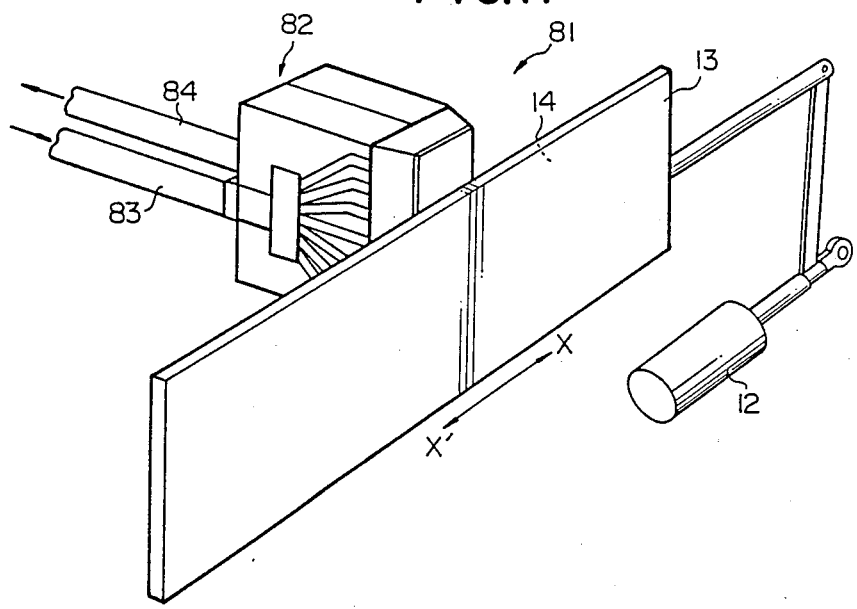
FIG. 17 is a diagrammatic perspective view showing the optical position sensor head of an optical position sensor constructed in accordance with a fifth embodiment of the present invention.

In FIG. 17, reference numerals 81 and 82 designate a linear encoder and an optical position sensor head, respectively. The input and output lights of the optical position sensor head 82 are guided by a single optical fiber 83 and a single optical fiber 84, respectively. Each of the optical fibers 83 and 84 is adapted to transmit at the same time a plurality of lights which are different in wave length from one another. This will hereinafter be referred to as "wavelength multiplexing".

Figure 18:
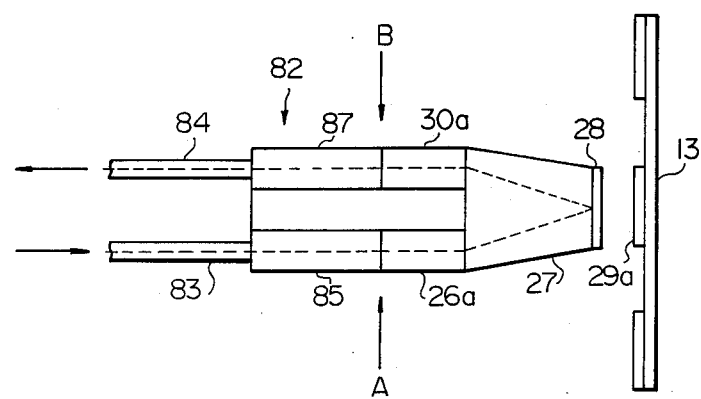
FIG. 18 is a top plan view of the optical position sensor head shown in FIG. 17.
Figure 19:
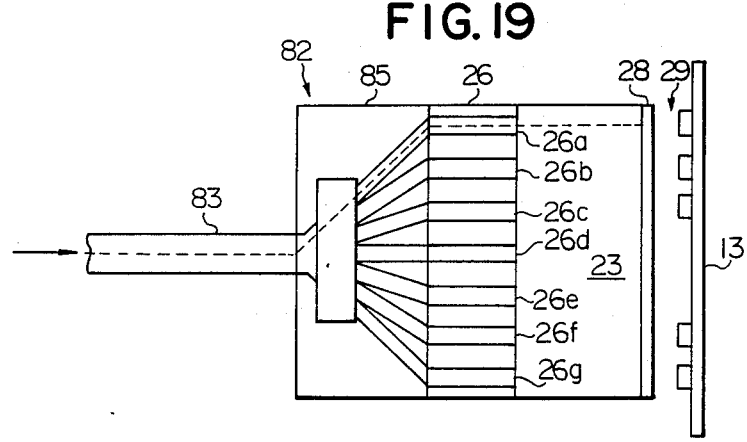
FIG. 19 is a side elevational view of the optical position sensor head taken in the direction A of FIG. 17.

In FIG. 18, the input lights are guided by the optical fiber 83 and fractionated into lights each having a different wave length by a first optical multiplexer (first fractionating means) 85. As shown in FIG. 19, the optical multiplexer 85 fractionates the input lights into seven different lights having different wave lengths, and the seven different lights are linearly polarized by corresponding polarizers 26a, 26b, 26c, 26d, 26e, 26f and 26g. The input lights to be guided to the optical fiber 83 is guided, as shown in FIG. 20, by a first optical coupler (first optical mixing means) 85 which is adapted to composite lights emitted from semiconductor lasers 87b to 87f and transmit a single composite light.

The aforesaid first optical coupler 86, optical fiber 83, first optical multiplexer 85 as a whole constitute first optical wave guiding means.

The semiconductor lasers 87b to 87f are adapted to emit lights with time sharing in accordance with timing signals from a timing generating circuit (timing generating means) 68, and the emitted lights are different in wave length from one another. Therefore, the timings of the lights reflected by a magneto-optical effect element 28 become different from one another, and a serial optical signal composited by a second optical coupler (second optical mixing means) 88 is guided through an optical fiber 84 to a second optical multiplexer (second fractionating means) 89.

The semiconductor lasers and timing generating means 68 constitute light emitting means. The second optical coupler 88, optical fiber 84 and second optical multiplexer 89 constitute second optical wave guiding means.

The lights guided to the second optical multiplexer 89 are fractionated into different lights of different wave lengths respectively corresponding to the semiconductor lasers 87b to 87f, and the fractionated different lights are inputted to an opto-electric conversion element array 90 corresponding to the channels CHb to CHf. The opto-electric conversion element array 90 comprises opto-electric conversion elements each having sufficient sensibility to the wave length of a light to be received, and even if the wave length were different, the output level of the opto-electric conversion would be maintained constant. The electric signals outputted from the opto-electric conversion element array 90 are different in timing from one another, and converted into parallel data having the same timing, i.e., decoded data by a demodulator 70.

Thus, in the fifth embodiment the same effect as the second embodiment can be obtained by time sharing an input light and by "wavelength multiplexing" (i.e., transmit at the same time a plurality of lights which are different in wave length from one another). For this reason, the fifth embodiment is advantageous in that each of the optical fibers 83 and 84 can be made a single optical fiber.

FIG. 21 schematically illustrates transmission paths of optical signals in accordance with a sixth embodiment of the present invention. This embodiment is substantially identical to the fifth embodiment shown in FIG. 20 except that input lights are not fractionated with time sharing. Therefore, this embodiment does not need the timing generating circuit 68 as shown in FIG. 20.

Figure 22:
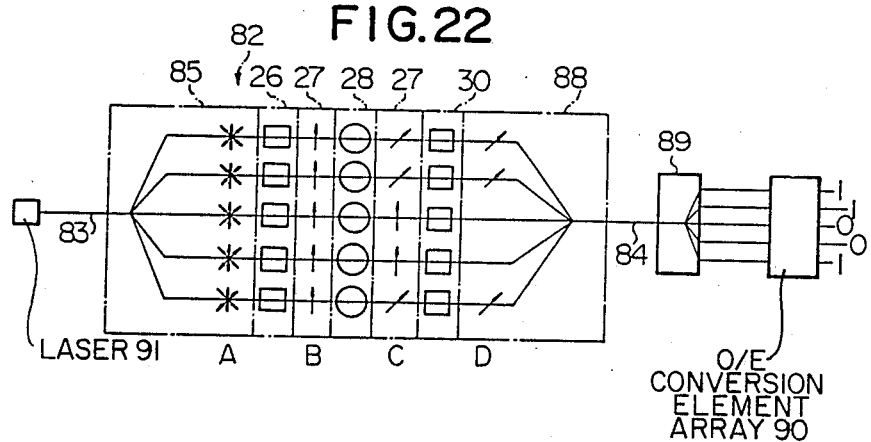
FIG. 22 is a schematic diagram illustrating transmission paths of optical signals in accordance with a seventh embodiment of the present invention.
Figure 23:
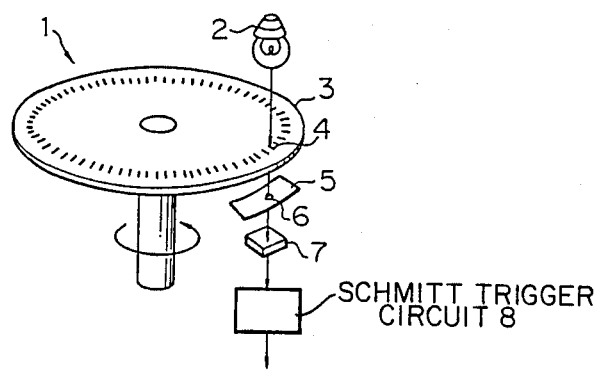
FIG. 23 is a schematic view showing a prior-art optical position sensor.

FIG. 22 schematically illustrates transmission paths of optical signals in accordance with a seventh embodiment of the present invention. This embodiment is characterized in that light emitting means comprises a single semiconductor laser 91 and that a plurality of lights which are different in wave length from one another are transmitted at the same time. The semiconductor laser 91 is adapted to emit a plurality of different lights which are different in wave length from one another. The light emitted from the semiconductor laser 91 is guided to a multiplexer 85 by an optical fiber 83, and is fractionated into lights each having a predetermined wave length by the multiplexer 85. Accordingly, in this embodiment the same effect as the fifth embodiment can be obtained by provision of the multicolor light emitting means 91. For this reason, this embodiment is structurally simple and can further reduce production cost.

While the optical position sensor according to the present invention has been applied to a linear encoder which detects a position of a body, it is noted that it also may be applied to a rotary encoder which detects a rotation of a rotary body. In addition, the present invention is applicable to a demodulator, since an optical signal passing through an optical position sensor head is demodulated by arranging a magnetic head, which gives magnetism to the magneto-optical effect element 28 and which has channels corresponding in number to those of an optical position sensor head, in opposed relationship to the optical position sensor head and by changing a polarity of the magnetism generated by the magnetic head. Furthermore, the present invention is applicable to an optical switch of the multichannel type, since a plurality of different optical signals can be obtained in proportion to electric signals impressed to the magnetic head by changing the magnetic intensity so that an angle of the Kerr rotation is change in proportion to the magnetic intensity.

From the foregoing description, it will be seen that in accordance with the present invention there is provided an optical position sensor which is capable of controlling a light emitted from light emitting means without passing the light through air by the use of the aforementioned "Kerr effect reflection means (magneto-optical effect element)" and which can prevent the damp and deterioration of the light even under particular circumstances in which dew and the like tend to occur.

While certain representative embodiments and details have been shown for the purpose of illustrating the invention, it will be apparent to those skilled in this art that various changes and modifications may be made therein without departing from the scope of the invention.

What we claim is:

1. An optical position sensor for use on aircraft comprising:
   light emitting means for emitting light;
   an optical block having a Kerr effect type magneto-optical effect element mounted thereon;
   a movable magnetic scale disposed in opposed relationship to said magneto-optical effect element and having a plurality of magnetized segments mounted thereon;
   first optical wave guiding means connected at its one end to said light emitting means, the first optical wave guiding means being adapted for guiding said light emitted from said light emitting means;
   polarizing means connected at its one end directly to the other end of said first optical wave guiding means and at its other end directly to one end of said optical block, the polarizing means being adapted to convert said light into light having a single plane of polarization, the single plane of polarization being rotated to a predetermined angle by said magneto-optical effect element in the presence of said magnetized segments;
   polarization detecting means connected at its one end directly to the other end of said optical block, the polarization detecting means being adapted to pass therethrough light wherein the single plane of polarization is rotated to said predetermined angle;
   second optical wave guiding means connected at its one end directly to the other end of said polarization detecting means, the second optical wave guiding means being adapted for guiding said light from said polarization detecting means; and
   opto-electric converting means connected to the other end of said second optical wave guiding means, the opto-electric converting means being adapted for converting said light guided by said second optical wave guiding means into an electrical signal.

2. An optical position sensor as set forth in claim 1, wherein said first optical wave guiding means comprises a plurality of optical fibers and said polarizing means comprises a plurality of polarizers corresponding in number to said plurality of optical fibers and respectively connected directly with said plurality of optical fibers, and wherein said polarization means comprises a plurality of analyzers and said second optical wave guiding means comprises a plurality of optical fibers corresponding in number to said plurality of analyzers and respectively connected directly with said plurality of analyzers.

3. An optical position sensor as set forth in claim 1, wherein said optical block, said first optical wave guiding means, said polarizing means, said polarizing detecting means and said second optical wave guiding means comprise in combination means to define a propagation path for an optical signal which does not pass through an air space.

* * * * *